United States Patent
Cava

(10) Patent No.: US 11,647,252 B2
(45) Date of Patent: May 9, 2023

(54) IDENTIFICATION OF ELEMENTS IN A GROUP FOR DYNAMIC ELEMENT REPLACEMENT

(71) Applicant: HULU, LLC, Santa Monica, CA (US)

(72) Inventor: Zachary McKeel Cava, Seattle, WA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 17/188,238

(22) Filed: Mar. 1, 2021

(65) Prior Publication Data

US 2021/0274245 A1 Sep. 2, 2021

Related U.S. Application Data

(60) Provisional application No. 62/983,419, filed on Feb. 28, 2020.

(51) Int. Cl.
*H04N 21/4402* (2011.01)
*H04N 21/234* (2011.01)
*H04N 21/2543* (2011.01)
*H04N 21/81* (2011.01)

(52) U.S. Cl.
CPC ... *H04N 21/4402* (2013.01); *H04N 21/23424* (2013.01); *H04N 21/25435* (2013.01); *H04N 21/812* (2013.01)

(58) Field of Classification Search
CPC ......... H04N 21/4402; H04N 21/23424; H04N 21/25435; H04N 21/812
See application file for complete search history.

(56) References Cited

U.S. PATENT DOCUMENTS

| 8,799,943 | B1* | 8/2014 | Sherwin | H04N 21/812 |
| | | | | 725/32 |
| 2005/0289588 | A1* | 12/2005 | Kinnear | H04N 21/812 |
| | | | | 725/35 |

(Continued)

FOREIGN PATENT DOCUMENTS

| BR | 1120220169167 | 10/2022 |
| CN | 115136609 A | 9/2022 |

(Continued)

OTHER PUBLICATIONS

Iraj Sodagar, Microsoft Corporation, "White paper on MPEG-DASH Standard", 6 pages, Apr. 2012, Incheon, KR.

(Continued)

*Primary Examiner* — Pinkal R Chokshi
(74) *Attorney, Agent, or Firm* — Kwan & Olynick LLP

(57) ABSTRACT

In some embodiments, a method determines an element is associated with a value in a manifest description presentation for a media presentation being played. The value indicates the element of the manifest description presentation is part of a group. The method reviews the manifest description presentation to determine a plurality of elements that are associated with the value and sends a request to a device to resolve the plurality of elements using information from one of the elements. Information for supplement content is received for the group where the information for the supplemental content is inserted in the manifest description presentation in place of the plurality of elements.

21 Claims, 20 Drawing Sheets

(56) References Cited

U.S. PATENT DOCUMENTS

| | | | |
|---|---|---|---|
| 2012/0042090 A1* | 2/2012 | Chen | H04N 21/8455 709/231 |
| 2012/0243850 A1* | 9/2012 | Basra | H04N 5/76 386/248 |
| 2014/0068690 A1* | 3/2014 | Luthra | H04N 21/4363 725/110 |
| 2014/0150019 A1 | 5/2014 | Ma et al. | |
| 2014/0359081 A1 | 12/2014 | Deventer et al. | |
| 2015/0019629 A1 | 1/2015 | Giladi et al. | |
| 2015/0067722 A1* | 3/2015 | Bjordammen | H04L 65/70 725/32 |
| 2015/0269629 A1 | 9/2015 | Lo et al. | |
| 2016/0294909 A1* | 10/2016 | Killick | H04L 51/046 |
| 2017/0171287 A1* | 6/2017 | Famaey | H04N 21/85406 |
| 2017/0272983 A1* | 9/2017 | Oyman | H04L 65/60 |
| 2017/0310722 A1 | 10/2017 | Chen et al. | |
| 2017/0310752 A1 | 10/2017 | Knothe | |
| 2017/0359628 A1 | 12/2017 | Sachdev et al. | |
| 2018/0097864 A1 | 4/2018 | Brinkley et al. | |
| 2018/0152741 A1 | 5/2018 | Asarikuniyil et al. | |
| 2019/0075148 A1 | 3/2019 | Nielsen et al. | |
| 2019/0141367 A1 | 5/2019 | Loheide et al. | |
| 2019/0238950 A1* | 8/2019 | Stockhammer | H04N 21/6587 |
| 2019/0313150 A1 | 10/2019 | Cava | |
| 2021/0144422 A1* | 5/2021 | Wagner | H04N 21/4131 |
| 2021/0274241 A1 | 9/2021 | Cava | |
| 2021/0274245 A1 | 9/2021 | Cava | |

FOREIGN PATENT DOCUMENTS

| | | |
|---|---|---|
| EP | 4111698 A1 | 1/2023 |
| KR | 10-2012-0029299 A | 3/2012 |
| KR | 10-2019-0128120 A | 11/2019 |
| WO | 2021174214 A1 | 9/2021 |
| WO | 2021174219 A1 | 9/2021 |

OTHER PUBLICATIONS

Steve DeRose, et al., "XML Linking Language (XLink) Version 1.1", 25 pages, May 6, 2010.

Related U.S. Appl. No. 17/188,151, filed Mar. 1, 2021, 52 pages, unpublished.

International Search Report and Written Opinion for International Appln. No PCT/US2021/020348 dated Jun. 18, 2021, 11 pages.

Related International Search Report and Written Opinion for International Appln. No. PCT/US2021/020340 dated Jun. 18, 2021, 11 pages.

International Application No. PCT/US2021/020340, filed Mar. 1, 2021, International Preliminary Report on Patentablility and Written Opinion, dated Aug. 30, 2022, 7 pages.

International Application No. PCT/US2021/020348, filed Mar. 1, 2021, International Preliminary Report on Patentablility and Written Opinion, dated Aug. 30, 2022, 6 pages.

* cited by examiner

```xml
<?xml version="1.0" encoding="utf-8"?>
<MPD xmlns="urn:mpeg:dash:schema:mpd:2011" xmlns:xlink="http://www.w3.org/1999/xlink" ... type="static" ...>
  <Period id="content-chapter-1" duration="PT300.00S" ...>
    <AdaptationSet mimeType="video/mp4" ...>
      <Representation id="video-1" ...>
        <SegmentBase timescale="10000000" ...>...</SegmentBase>
        ...
      </Representation>
      ...
    </AdaptationSet>
    <AdaptationSet mimeType="audio/mp4" ...>
      <Representation id="audio-1" ...>
        <SegmentBase timescale="10000000" ...>...</SegmentBase>
        ...
      </Representation>
      ...
    </AdaptationSet>
    ...
  </Period>       302
  <Period id="remote-placeholder" xlink:href="https://example.com/manifests/xlink/1" xlink:actuate="onRequest"></Period>
  <Period id="content-chapter-2" duration="PT150.00S" ...>
    <AdaptationSet mimeType="video/mp4" ...>
      <Representation id="video-1" ...>
        <SegmentBase timescale="10000000" presentationTimeOffset="3000000000" ...>...</SegmentBase>
        ...
      </Representation>
      ...
    </AdaptationSet>
    <AdaptationSet mimeType="audio/mp4" ...>
      <Representation id="audio-1" ...>
        <SegmentBase timescale="10000000" presentationTimeOffset="3000000000" ...>...</SegmentBase>
        ...
      </Representation>
      ...
    </AdaptationSet>
    ...
  </Period>
  ...
</MPD>
```

FIG. 3

```
<Period id="remote-1-1-1" duration="PT30.00S" xlink:href="https://example.com/       420-1
manifests/xlink/1-1" xlink:actuate="onRequest" ...>         418-1
    <SupplementalProperty schemeIdUri="urn:mpeg:dash:resolution-connected:2020"
value="remote-1-1" />
    <AdaptationSet mimeType="video/mp4" ...>
      <Representation id="video-1" ...>...</Representation>
      ...
    </AdaptationSet>
    <AdaptationSet mimeType="audio/mp4" ...>
      <Representation id="audio-1" ...>...</Representation>
      ...
    </AdaptationSet>
    ...
</Period>
<Period id="remote-1-1-2" duration="PT15.00S" xlink:href="https://example.com/       420-2
manifests/xlink/1-1" xlink:actuate="onRequest" ...>         418-2
    <SupplementalProperty schemeIdUri="urn:mpeg:dash:resolution-connected:2020"
value="remote-1-1" />
    <AdaptationSet mimeType="video/mp4" ...>
      <Representation id="video-1" ...>...</Representation>
      ...
    </AdaptationSet>
    <AdaptationSet mimeType="audio/mp4" ...>
      <Representation id="audio-1" ...>...</Representation>
      ...
    </AdaptationSet>
    ...
</Period>
<Period id="remote-1-1-3" duration="PT15.00S" xlink:href="https://example.com/       420-3
manifests/xlink/1-1" xlink:actuate="onRequest" ...>         418-3
    <SupplementalProperty schemeIdUri="urn:mpeg:dash:resolution-connected:2020"
value="remote-1-1" />
    <AdaptationSet mimeType="video/mp4" ...>
      <Representation id="video-1" ...>...</Representation>
      ...
    </AdaptationSet>
    <AdaptationSet mimeType="audio/mp4" ...>
      <Representation id="audio-1" ...>...</Representation>
      ...
    </AdaptationSet>
    ...
```

FIG. 4B

```
...
                                                                    420-4
</Period>
<Period id="remote-1-1-4" duration="PT30.00S" xlink:href="https://example.com/
manifests/xlink/1-1" xlink:actuate="onRequest" ...>    418-4
   <SupplementalProperty schemeIdUri="urn:mpeg:dash:resolution-connected:2020"
value="remote-1-1" />
   <AdaptationSet mimeType="video/mp4" ...>
      <Representation id="video-1" ...>...</Representation>
      ...
   </AdaptationSet>
   <AdaptationSet mimeType="audio/mp4" ...>
      <Representation id="audio-1" ...>...</Representation>
      ...
   </AdaptationSet>
   ...
</Period>
```

FIG. 4C

```xml
<?xml version="1.0" encoding="utf-8"?>
<MPD xmlns="urn:mpeg:dash:schema:mpd:2011" xmlns:xlink="http://www.w3.org/1999/
xlink" ... type="static" ...>
  <Period id="content-chapter-1" duration="PT300.00S" ...>     506-1
    <AdaptationSet mimeType="video/mp4" ...>
      <Representation id="video-1" ...>
        <SegmentBase timescale="10000000" ...>...</SegmentBase>     ...
      </Representation>
      ...
    </AdaptationSet>
    <AdaptationSet mimeType="audio/mp4" ...>
      <Representation id="audio-1" ...>
        <SegmentBase timescale="10000000" ...>...</SegmentBase>
        ...
      </Representation>
      ...
    </AdaptationSet>
    ...                                                              504-1
  </Period>
  <Period id="remote-1-1-1" duration="PT30.00S" xlink:href="https://example.com/
manifests/xlink/1-1" xlink:actuate="onRequest" ...>     502-1
    <SupplementalProperty schemeIdUri="urn:mpeg:dash:resolution-connected:2020"
value="remote-1-1" />
    <AdaptationSet mimeType="video/mp4" ...>
      <Representation id="video-1" ...>...</Representation>
      ...
    </AdaptationSet>
    <AdaptationSet mimeType="audio/mp4" ...>
      <Representation id="audio-1" ...>...</Representation>
      ...
    </AdaptationSet>
    ...                                                              504-2
  </Period>
  <Period id="remote-1-1-2" duration="PT15.00S" xlink:href="https://example.com/
manifests/xlink/1-1" xlink:actuate="onRequest" ...>     502-2
    <SupplementalProperty schemeIdUri="urn:mpeg:dash:resolution-connected:2020"
value="remote-1-1" />
    <AdaptationSet mimeType="video/mp4" ...>
      <Representation id="video-1" ...>...</Representation>
      ...
    </AdaptationSet>
    <AdaptationSet mimeType="audio/mp4" ...>
      <Representation id="audio-1" ...>...</Representation>
      ...
    </AdaptationSet>
    ...
```

FIG. 5A

```
...
   </Period>
   <Period id="remote-1-1-3" duration="PT15.00S" xlink:href="https://example.com/manifests/xlink/1-1"
xlink:actuate="onRequest" ...>                        502-3
      <SupplementalProperty schemeIdUri="urn:mpeg:dash:resolution-connected:2020" value="remote-1-
1" />
      <AdaptationSet mimeType="video/mp4" ...>
        <Representation id="video-1" ...>...</Representation>
        ...
      </AdaptationSet>
      <AdaptationSet mimeType="audio/mp4" ...>
        <Representation id="audio-1" ...>...</Representation>
        ...
      </AdaptationSet>
   ...
   </Period>
   <Period id="remote-1-1-4" duration="PT30.00S" xlink:href="https://example.com/manifests/xlink/1-1"
xlink:actuate="onRequest" ...>                        502-4
      <SupplementalProperty schemeIdUri="urn:mpeg:dash:resolution-connected:2020" value="remote-1-
1" />
      <AdaptationSet mimeType="video/mp4" ...>
        <Representation id="video-1" ...>...</Representation>
        ...
      </AdaptationSet>
      <AdaptationSet mimeType="audio/mp4" ...>
        <Representation id="audio-1" ...>...</Representation>
        ...
      </AdaptationSet>
   ...
   </Period>
   <Period id="content-chapter-2" duration="PT150.00S" ...>  506-2
      <AdaptationSet mimeType="video/mp4" ...>
        <Representation id="video-1" ...>
          <SegmentBase timescale="10000000" presentationTimeOffset="3000000000" ...>...</
SegmentBase>
          ...
        </Representation>
        ...
      </AdaptationSet>
      <AdaptationSet mimeType="audio/mp4" ...>
        <Representation id="audio-1" ...>
          <SegmentBase timescale="10000000" presentationTimeOffset="3000000000" ...>...</
SegmentBase>
          ...
        </Representation>
        ...
      </AdaptationSet>
      ...
   </Period>
   ...
</MPD>
```

Labels: 504-3, 504-4

FIG. 5B

```xml
<Period id="remote-1-2-1" duration="PT15.00S" xlink:href="https://example.com/manifests/xlink/1-2" xlink:actuate="onRequest" ...>
   <SupplementalProperty schemeIdUri="urn:mpeg:dash:resolution-connected:2020" value="remote-1-2" />
   <AdaptationSet mimeType="video/mp4" ...>
      <Representation id="video-1" ...>...</Representation>
      ...
   </AdaptationSet>
   <AdaptationSet mimeType="audio/mp4" ...>
      <Representation id="audio-1" ...>...</Representation>
      ...
   </AdaptationSet>
   ...
</Period>
<Period id="remote-1-2-2" duration="PT15.00S" xlink:href="https://example.com/manifests/xlink/1-2" xlink:actuate="onRequest" ...>
   <SupplementalProperty schemeIdUri="urn:mpeg:dash:resolution-connected:2020" value="remote-1-2" />
   <AdaptationSet mimeType="video/mp4" ...>
      <Representation id="video-1" ...>...</Representation>
      ...
   </AdaptationSet>
   <AdaptationSet mimeType="audio/mp4" ...>
      <Representation id="audio-1" ...>...</Representation>
      ...
   </AdaptationSet>
   ...
</Period>
```

FIG. 6B

```xml
<?xml version="1.0" encoding="utf-8"?>
<MPD xmlns="urn:mpeg:dash:schema:mpd:2011" xmlns:xlink="http://www.w3.org/1999/xlink" ... type="static" ...>
   <Period id="content-chapter-1" duration="PT300.00S" ...>
      <AdaptationSet mimeType="video/mp4" ...>
         <Representation id="video-1" ...>
            <SegmentBase timescale="10000000" ...>...</SegmentBase>
            ...
         </Representation>
         ...
      </AdaptationSet>
      <AdaptationSet mimeType="audio/mp4" ...>
         <Representation id="audio-1" ...>
            <SegmentBase timescale="10000000" ...>...</SegmentBase>
            ...
         </Representation>
         ...
      </AdaptationSet>
      ...
   </Period>
   <Period id="remote-1-2-1" duration="PT15.00S" xlink:href="https://example.com/manifests/xlink/1-2" xlink:actuate="onRequest" ...>   ← 702-1
      <SupplementalProperty schemeIdUri="urn:mpeg:dash:resolution-connected:2020" value="remote-1-2" />
      <AdaptationSet mimeType="video/mp4" ...>
         <Representation id="video-1" ...>...</Representation>
         ...
      </AdaptationSet>
      <AdaptationSet mimeType="audio/mp4" ...>
         <Representation id="audio-1" ...>...</Representation>
         ...
      </AdaptationSet>
      ...
```

FIG. 7A

```
    </Period>            ⌐702-2
      <Period id="remote-1-2-2" duration="PT15.00S" xlink:href="https://example.com/
  manifests/xlink/1-2" xlink:actuate="onRequest" ...>
        <SupplementalProperty schemeIdUri="urn:mpeg:dash:resolution-connected:2020"
  value="remote-1-2" />
        <AdaptationSet mimeType="video/mp4" ...>
          <Representation id="video-1" ...>...</Representation>
          ...
        </AdaptationSet>
        <AdaptationSet mimeType="audio/mp4" ...>
          <Representation id="audio-1" ...>...</Representation>
          ...
        </AdaptationSet>
        ...
    </Period>
      <Period id="content-chapter-2" duration="PT150.00S" ...>
        <AdaptationSet mimeType="video/mp4" ...>
          <Representation id="video-1" ...>
            <SegmentBase timescale="10000000" presentationTimeOffset="3000000000"
  ...>...</SegmentBase>
            ...
          </Representation>
          ...
        </AdaptationSet>
        <AdaptationSet mimeType="audio/mp4" ...>
          <Representation id="audio-1" ...>
            <SegmentBase timescale="10000000" presentationTimeOffset="3000000000"
  ...>...</SegmentBase>
            ...
          </Representation>
          ...
        </AdaptationSet>
        ...
    </Period>
    ...
  </MPD>
```

FIG. 7B

```xml
<?xml version="1.0" encoding="utf-8"?>
<MPD xmlns="urn:mpeg:dash:schema:mpd:2011" xmlns:xlink="http://www.w3.org/1999/xlink" ... type="static" ...>
  <Period id="content-chapter-1" duration="PT60.00S" ...>
    <AdaptationSet mimeType="video/mp4" ...>
      <Representation id="video-1" ...>
        <SegmentBase timescale="10000000" ...>...</SegmentBase>
        ...
      </Representation>
      ...
    </AdaptationSet>
    <AdaptationSet mimeType="audio/mp4" ...>
      <Representation id="audio-1" ...>
        <SegmentBase timescale="10000000" ...>...</SegmentBase>
        ...
      </Representation>
      ...
    </AdaptationSet>
    ...
  </Period>                     ⟵ 802-1
  <Period id="original-ad-1" duration="PT15.00S" xlink:href="https://example.com/manifests/xlink/1" xlink:actuate="onRequest" ...>
    <SupplementalProperty schemeIdUri="urn:mpeg:dash:resolution-connected:2020" value="original-ad-1" />   ⟵ 804-1
    <AdaptationSet mimeType="video/mp4" ...>
      <Representation id="video-1" ...>
        <SegmentBase timescale="10000000" presentationTimeOffset="600000000" ...>...</SegmentBase>
        ...
      </Representation>
      ...
    </AdaptationSet>
    <AdaptationSet mimeType="audio/mp4" ...>
      <Representation id="audio-1" ...>
        <SegmentBase timescale="10000000" presentationTimeOffset="600000000" ...>...</SegmentBase>
        ...
      </Representation>
      ...
    </AdaptationSet>
    ...
```

FIG. 8A

```
</Period>                    ┌─802-2
    <Period id="original-ad-2" duration="PT30.00S" xlink:href="https://example.com/
manifests/xlink/1" xlink:actuate="onRequest" ...>
      <SupplementalProperty schemeIdUri="urn:mpeg:dash:resolution-connected:2020"
value="original-ad-1" />∕∽ 804-2
      <AdaptationSet mimeType="video/mp4" ...>
        <Representation id="video-1" ...>
          <SegmentBase timescale="10000000" presentationTimeOffset="750000000"
...>...</SegmentBase>
          ...
        </Representation>
        ...
      </AdaptationSet>
      <AdaptationSet mimeType="audio/mp4" ...>
        <Representation id="audio-1" ...>
          <SegmentBase timescale="10000000" presentationTimeOffset="750000000"
...>...</SegmentBase>
          ...
        </Representation>
        ...
      </AdaptationSet>
      ...
    </Period>
    <Period id="content-chapter-2" duration="PT300.00S" ...>
      <AdaptationSet mimeType="video/mp4" ...>
        <Representation id="video-1" ...>
          <SegmentBase timescale="10000000"
presentationTimeOffset="1050000000" ...>...</SegmentBase>
          ...
        </Representation>
        ...
      </AdaptationSet>
      <AdaptationSet mimeType="audio/mp4" ...>
        <Representation id="audio-1" ...>
          <SegmentBase timescale="10000000"
presentationTimeOffset="1050000000" ...>...</SegmentBase>
          ...
        </Representation>
        ...
      </AdaptationSet>
      ...
    </Period>
    ...
</MPD>
```

FIG. 8B

```
                        ┌─ 902-1
<Period id="remote-1-1-1" duration="PT30.00S" xlink:href="https://example.com/
manifests/xlink/1-1" xlink:actuate="onRequest" ...>
  <SupplementalProperty schemeIdUri="urn:mpeg:dash:resolution-connected:2020"
value="remote-1-1" />  ── 904-1
    <AdaptationSet mimeType="video/mp4" ...>
      <Representation id="video-1" ...>...</Representation>
      ...
    </AdaptationSet>
    <AdaptationSet mimeType="audio/mp4" ...>
      <Representation id="audio-1" ...>...</Representation>
      ...
    </AdaptationSet>
    ...
</Period>        ┌─ 902-2
<Period id="remote-1-1-2" duration="PT15.00S" xlink:href="https://example.com/
manifests/xlink/1-1" xlink:actuate="onRequest" ...>
  <SupplementalProperty schemeIdUri="urn:mpeg:dash:resolution-connected:2020"
value="remote-1-1" />  ── 904-2
    <AdaptationSet mimeType="video/mp4" ...>
      <Representation id="video-1" ...>...</Representation>
      ...
    </AdaptationSet>
    <AdaptationSet mimeType="audio/mp4" ...>
      <Representation id="audio-1" ...>...</Representation>
      ...
    </AdaptationSet>
    ...
</Period>        ┌─ 902-3
<Period id="remote-1-1-3" duration="PT30.00S" xlink:href="https://example.com/
manifests/xlink/1-1" xlink:actuate="onRequest" ...>
  <SupplementalProperty schemeIdUri="urn:mpeg:dash:resolution-connected:2020"
value="remote-1-1" />  ── 904-3
    <AdaptationSet mimeType="video/mp4" ...>
      <Representation id="video-1" ...>...</Representation>
      ...
    </AdaptationSet>
    <AdaptationSet mimeType="audio/mp4" ...>
      <Representation id="audio-1" ...>...</Representation>
      ...
    </AdaptationSet>
    ...
</Period>
```

FIG. 9

```
<?xml version="1.0" encoding="utf-8"?>
<MPD xmlns="urn:mpeg:dash:schema:mpd:2011" xmlns:xlink="http://www.w3.org/1999/
xlink" ... type="static" ...>      ⌐1006
    <Period id="content-chapter-1" duration="PT60.00S" ...>
        <AdaptationSet mimeType="video/mp4" ...>
            <Representation id="video-1" ...>
                <SegmentBase timescale="10000000" ...>...</SegmentBase>
                ...
            </Representation>
            ...
        </AdaptationSet>
        <AdaptationSet mimeType="audio/mp4" ...>
            <Representation id="audio-1" ...>
                <SegmentBase timescale="10000000" ...>...</SegmentBase>
                ...
            </Representation>
            ...
        </AdaptationSet>
        ...
    </Period>
    <Period id="remote-1-1-1" duration="PT30.00S" xlink:href="https://example.com/
manifests/xlink/1-1" xlink:actuate="onRequest" ...>    1002-1
        <SupplementalProperty schemeIdUri="urn:mpeg:dash:resolution-connected:2020"
value="remote-1-1" />
        <AdaptationSet mimeType="video/mp4" ...>
            <Representation id="video-1" ...>...</Representation>
            ...
        </AdaptationSet>
        <AdaptationSet mimeType="audio/mp4" ...>
            <Representation id="audio-1" ...>...</Representation>
            ...
        </AdaptationSet>
        ...
```

```
</Period>
    <Period id="remote-1-1-2" duration="PT15.00S" xlink:href="https://example.com/
manifests/xlink/1-1" xlink:actuate="onRequest" ...>    1002-2
        <SupplementalProperty schemeIdUri="urn:mpeg:dash:resolution-connected:2020"
value="remote-1-1" />
        <AdaptationSet mimeType="video/mp4" ...>
            <Representation id="video-1" ...>...</Representation>
            ...
        </AdaptationSet>
        <AdaptationSet mimeType="audio/mp4" ...>
            <Representation id="audio-1" ...>...</Representation>
            ...
        </AdaptationSet>
        ...
</Period>
    <Period id="remote-1-1-3" duration="PT30.00S" xlink:href="https://example.com/
manifests/xlink/1-1" xlink:actuate="onRequest" ...>    1002-3
        <SupplementalProperty schemeIdUri="urn:mpeg:dash:resolution-connected:2020"
value="remote-1-1" />
        <AdaptationSet mimeType="video/mp4" ...>
            <Representation id="video-1" ...>...</Representation>
            ...
        </AdaptationSet>
        <AdaptationSet mimeType="audio/mp4" ...>
            <Representation id="audio-1" ...>...</Representation>
            ...
        </AdaptationSet>
        ...
```

```
</Period>
   <Period id="content-chapter-2" duration="PT300.00S" ...>
     <AdaptationSet mimeType="video/mp4" ...>
       <Representation id="video-1" ...>
         <SegmentBase timescale="10000000" presentationTimeOffset="1050000000"
...>...</SegmentBase>
           ...
         </Representation>
         ...
       </AdaptationSet>
       <AdaptationSet mimeType="audio/mp4" ...>
         <Representation id="audio-1" ...>
           <SegmentBase timescale="10000000" presentationTimeOffset="1050000000"
...>...</SegmentBase>
           ...
         </Representation>
         ...
       </AdaptationSet>
       ...
    </Period>
    ...
</MPD>
```

FIG. 10C

IDENTIFICATION OF ELEMENTS IN A GROUP FOR DYNAMIC ELEMENT REPLACEMENT

CROSS REFERENCE TO RELATED APPLICATIONS

Pursuant to 35 U.S.C. § 119(e), this application is entitled to and claims the benefit of the filing date of U.S. Provisional App. No. 62/983,419 filed Feb. 28, 2020, the content of which is incorporated herein by reference in its entirety for all purposes.

BACKGROUND

Live streaming requires continuous delivery of segments to clients using a media presentation description. Different streaming protocols may be used, such as Dynamic Adaptive Streaming over HTTP (DASH) and Hypertext Transfer Protocol (HTTP) live streaming (HLS). Clients acquire segment information via polling protocols. To enable features such as program start over, digital video recorder (DVR) windows, and seamless rollover, servers continually send to the client updates to a media presentation description that includes all known stream information from the time the client joined the stream. The new media presentation description includes some new information for additional segments, but also includes all the previous information that was sent, such as stream initialization information and information for the previous segments.

The media presentation description may also include information for supplemental content, such as advertisements, that can be inserted into the media presentation. The supplemental content may be included in a pod, which is included within the media presentation being played. Different methods may be used to insert the supplemental content into the stream. For example, Server-Guided Ad Insertion (SGAI) is an ad serving architecture that fully describes ad opportunities within the media presentation prior to the stream reaching the client, but has the client resolve the opportunities as needed to complete the presentation timeline. This type of insertion may be enabled by the update and remote resolution mechanics of the protocol.

A client sends a request for resolution of supplemental content for a pod that may resolve to four periods for four instances of supplemental content. In cases where re-resolution occurs, such as when the media presentation is rewound to encounter the pod again, the client may send four requests for re-resolution of the four instances of supplemental content. These four requests may result in sixteen instances of supplemental content being returned. This is because a server treats each request as translating to four instances of supplemental content. The resulting re-resolution results in undesirable behavior.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 3 depicts an initial manifest presentation description according to some embodiments.

FIGS. 4B and 4C depict an example dynamic resolution response according to some embodiments.

FIGS. 5A and 5B depict an in-memory manifest presentation description resulting from a client resolving the periods in the initial manifest presentation description according to some embodiments.

FIG. 6B depicts another example of a dynamic resolution response resulting from the client resolving new periods in the initial manifest presentation description with supplemental content according to some embodiments.

FIGS. 7A and 7B depict the in-memory manifest presentation description resulting from a client performing re-resolution on the periods previously provided by the first resolution and receiving a response found in FIG. 6B according to some embodiments.

FIGS. 8A and 8B depicts an initial manifest presentation description downloaded by a client that has adjacent remote periods with default content according to some embodiments.

FIG. 9 depicts an example remote period response that contains multiple periods intended to replace the default content according to some embodiments.

FIGS. 10A, 10B, and 10C depict in-memory manifest presentation document that results from the replacement according to some embodiments.

DETAILED DESCRIPTION

Figure 1:
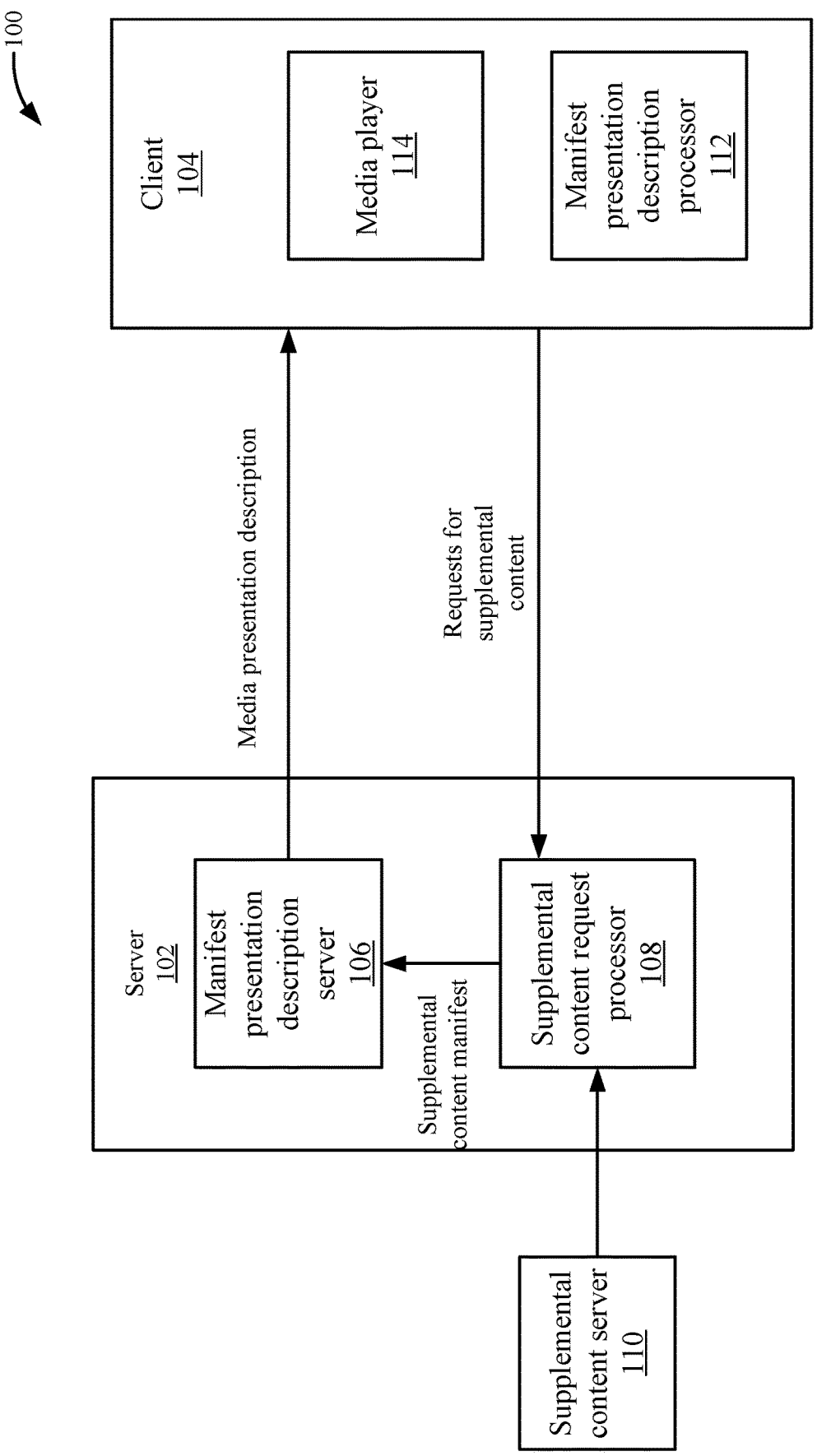
FIG. 1 depicts a simplified system for performing dynamic content replacement according to some embodiments.

Described herein are techniques for a content delivery system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Dynamic content replacement allows a video delivery system to dynamically insert supplemental content into a content stream, such as a live stream or a video on demand stream. The supplemental content, such as advertisements, may be content that is different from the main content in the media presentation currently being sent to a client. Other supplemental content may be appreciated, such as content that recommends other media presentations being offered on the video delivery system, network identification bumpers, emergency alerts, breaking news alerts, stream source switches, and user choice based content replacement ("choose your own adventure" type content).

Dynamic content replacement may be the process of resolving opportunities that are included at a point in the stream. The resolution happens while watching the stream, but before the point of an opportunity to insert supplemental content is reached for playout at the client. The client can resolve the opportunities by dynamically requesting supplemental content for the opportunities when needed. In some embodiments, the resolution may replace placeholder opportunities, such as opportunities that do not yet have supplemental content selected. For example, in a live stream, the client may resolve opportunities before reaching the opportunities to receive supplement content. These opportunities may be re-resolved upon encountering the opportunities again, such as when the media presentation is rewound. Also, the resolution may replace default content that is inserted within the live stream with dynamically selected content. For example, a live stream may have default advertisements that are included in the original stream and the default advertisements can replaced by a distributor of the stream. Alternatively, a video on demand stream may have default advertisements that are included in the stream.

When the stream is played, dynamically selected advertisements may replace the default advertisements. In some embodiments, dynamic content replacement may replace the default content with content that is targeted per user.

The placeholder opportunities may be included in elements of a manifest description presentation. The elements may be identified as periods, but may be identified by other identifiers or names. In some cases, a placeholder opportunity in the main content should be replaced with other opportunities in multiple adjacent periods as a group. For example, the stream may have a period in which a client sends a request to resolve when the period is first encountered in the manifest. The server may replace the period as a group with multiple periods that are associated with a group of multiple instances of supplemental content. The group of supplemental content can be associated with multiple periods, but the number of periods in the supplemental content is unrelated to the original number of periods in the original manifest. In some examples, a single period is replaced with four periods that are associated with four instances of supplemental content.

The supplemental content may further be replaced as a group again as part of re-resolution. This can occur in live streams that incur encoding configuration changes mid pod and in on-demand scenarios when a service provider wishes to re-resolve an opportunity after the user has replayed over a portion of a stream (e.g., rewound). Some embodiments use a descriptor scheme to designate periods as part of a resolution group to make re-resolution more efficient. The descriptor overcomes the disadvantages described in the Background. For example, a client may review the descriptor in the periods to determine periods that should be re-resolved as a group. Then, instead of sending multiple requests for each period, the client sends a single request for the group. This results in receiving a re-resolution, which may be multiple periods that are associated with multiple instances of supplemental content.

System Overview

FIG. 1 depicts a simplified system 100 for performing dynamic content replacement according to some embodiments. System 100 includes a server 102 and a client 104. Although one instance of server 102 and client 104 are shown, multiple instances of server 102 and client 104 may be used.

Server 102 may deliver media presentations to client 104. Server 102 may be part of a content delivery network (CDN), which may deliver media presentations and other content using multiple devices. When server 102 is discussed, the functionality may be performed by multiple devices in the CDN, and is not limited server 102. In one example, server 102 stores various media presentations, such as video (e.g., a title or show) that has been (or will be) encoded in multiple bitrates. For example, a media presentation has been divided into segments that an encoder encodes at multiple bitrates, from high to low. A media presentation is stored in different versions (i.e., bitrates) as media presentation #1 (high bitrate), media presentation #2 (medium bitrate), . . . , and media presentation #N (low bitrate). The different bitrates provide videos at different levels of quality. For example, a higher bitrate video will be of a higher quality than the medium bitrate, and the medium bitrate of a higher quality than the lower bitrate. Although these encodings are described, various embodiments may include different encodings at any number of bitrates.

Client 104 may include various user devices, such as cellular phones, set top boxes, streaming devices, personal computers, tablet computers, etc. Client 104 may include a media player 114 that can play the media presentation. For example, media player 114 may play video and/or audio from the media presentation. Client 104 includes a manifest presentation description processor 112 that processes manifest presentation descriptions and performs the remote resolution described herein.

A transport mechanism, such as a protocol specification including DASH (also known as MPEG-DASH) or HLS, may be used to transport information for segments of the media presentation from server 102 to client 104. Server 102 includes a manifest presentation description server 106 and a supplemental content request processor 108. Although manifest presentation description server 106 and a supplemental content request processor 108 are shown in the same server 102, it is noted they could be located in different devices. Also, although described separately, manifest presentation description server 106 and/or supplemental content manifest server 108 may not be separate entities and the functions may be performed by a single entity.

Manifest presentation description server 106 may send manifest presentation descriptions to a client 104. Client 104 receives the media presentation descriptions from server 102. Using the media presentation descriptions, client 104 (e.g., media player 114) may request segments of the media presentation from server 102. While receiving the segments of the media presentation, client 104 can evaluate the bandwidth in which client 104 receives the segments. One evaluation that client 104 may perform is to measure the amount of the media presentation (e.g., video) that is received over a period of time to estimate the available bandwidth. Depending on the available bandwidth, client 104 may make decisions on which bitrate (or version) of the media presentation to request. For example, client 104 determines which version of a media presentation to request for a segment of the media presentation, where the versions may include different bitrates.

Manifest presentation description server 106 may send manifest presentation descriptions to a client 104. Client 104 receives the media presentation descriptions from server 102. Using the media presentation descriptions, client 104 (e.g., media player 114) may request segments of the media presentation from server 102. While receiving the segments of the media presentation, client 104 can evaluate the bandwidth in which client 104 receives the segments. One evaluation that client 104 may perform is to measure the amount of the media presentation (e.g., video) received over a period of time to estimate the available bandwidth. Depending on the available bandwidth, client 104 may make decisions on which bitrate (or version) of the media presentation to request. For example, client 104 determines which version of a media presentation to request for a segment of the media presentation, where the versions may include different bitrates.

In addition to requesting different bitrates of the media presentation, client 104 may send requests to resolve supplemental content opportunities in the manifest presentation descriptions to supplemental content request processor 108 during playback of the media presentation. Then, supplemental content request processor 108 resolves the opportunities by determining which supplemental content to insert in the manifest presentation description. In the process, supplemental content request processor 108 may communicate with a supplemental content server 110 to determine the supplemental content. In some embodiments, content server 110 may identify supplemental content that can be dynamically inserted into the stream in the supplemental content opportunities, such as to replace default content (e.g., default ads), to resolve placeholder opportunities, or to re-resolve previous supplemental content opportunities in the stream. Default content may be opportunities that include statically defined supplemental content. That is, the manifest defines the supplemental to request. Placeholder opportunities are placeholders for client 104 to resolve the opportunities. Re-resolution occurs after an opportunity has been resolved.

A specification, such as XML Linking Language (XLink), may be used to perform the remote resolution. Although XLink is described, other protocols may be used that allow remote resolution. Remote resolution may be a resolution that is performed outside of client 104 to determine which supplemental content should be inserted into opportunities. A resolution and replacement mechanism may be used to combine remote elements with the main presentation. A first attribute may be used to describe a link that points to a location where the supplemental content can be retrieved. A second attribute describes when resolution of the supplemental content should be performed when processing the manifest presentation description. For example, XLink may include attributes that may be used, such as @xlink:href and @xlink:actuate. The attribute @xlink:href describes a link, such as a uniform resource identifier (URI), that points to a location where the supplemental content can be retrieved. The attribute @xlink:actuate describes when resolution of the supplemental content should be performed when processing the manifest presentation description. Other attributes may also be used.

The resolution may be triggered when a condition associated with the second attribute value is met by the client player state. For example, a value, such as "onLoad", signifies that the information for supplemental content should be requested when the original manifest presentation description is loaded. Also, a value, such as "onRequest", signifies the information for the supplemental content should be requested when the information becomes relevant to the manifest presentation description, such as when a period will be encountered during playback of the stream. The response elements of the resolution fully replace the original elements in the manifest presentation description with the remote resolution attributes. Client 104 reevaluates the in-memory manifest when the update occurs to request segments of the media presentation. Manifest presentation description server 106 may create the supplemental content manifest using the supplemental content identified by supplemental content request processor 108 and send the supplemental content manifest to client 104.

Manifest presentation description server 106 may create the supplemental content manifest using the supplemental content that is identified by supplemental content request processor 108. Manifest presentation description server 106 may provide the supplemental content for supplemental content opportunities to client 104. Multiple pieces of supplemental content may be grouped into a supplemental content pod and each instance of supplemental content may be identified by an element, such as a period, in the manifest presentation description. The period may be an element that identifies a discrete unit in the media presentation description. The period may identify individual segments of content and also supplemental content opportunities.

When using a dynamic resolution mechanism, it is possible for at least two scenarios to exist:

The original manifest presentation description contains multiple period elements representing default supplemental content that should be replaced in a singular remote resolution as a group. This may be the case for digital video recorder (DVR) and video on demand (VOD) media presentations that have the original broadcast advertisements identified in the original manifest presentation description.

A previous remote resolution was resolved to multiple periods, and on a subsequent resolution during the same playback, all periods returned in the previous resolution should be replaced together as a group by the new resolution. This may be the case for normal ad insertion where it is desired to provide new supplemental content for a supplemental content pod on each playthrough of the pod without reloading the whole stream. For example, the media presentation may be rewound, and a pod may be encountered again, and in which case, the previous group resolution should be replaced together by the new resolution group. However, requests for each period in the group should not be sent. Rather, a request for the original period should be sent, which can then be resolved into the new resolution group.

Some embodiments use an indication that identifies multiple period elements that should be acted on as a singular entity in the remote resolution process. For example, some embodiments use a descriptor that is placed in each period that should be part of a resolution group. Manifest presentation description processor 112 uses this descriptor to clearly identify the period elements that should be acted on as a singular entity in the remote resolution process. In some embodiments, manifest presentation description server 106 defines a descriptor scheme. The descriptor scheme may include a descriptor to identify a resolution group. The descriptor may be associated with an attribute in the manifest presentation description. In some embodiments, the descriptor may be used for all resolution groups, some resolution groups may have unique descriptors, or all resolution groups may have unique descriptors, etc. One example of a descriptor may be "urn:mpeg:dash:resolution-connected:2020". An attribute may be an element in the manifest presentation description that identifies a descriptor may be included, such as the @ schemeIdUri of a SupplementalProperty element. The value for the descriptor may identify periods that are part of a resolution group, such as multiple periods that are associated with the same descriptor value are part of a resolution group.

Manifest presentation description server 106 may set a value for the descriptor in the manifest presentation description. Then, manifest presentation description server 106 may place the descriptor and value in periods that should be considered as part of a resolution group. A value for the descriptor can be set to determine when opportunities should be treated as a group. For example, opportunities with the descriptor and a value set to the same value are treated as a group. However, a value for the descriptor can be set to determine when opportunities should not be treated as a group. For example, opportunities with the descriptor and a value set to different values are not treated as a group.

Manifest presentation description processor 112 may then consider multiple opportunities (e.g., periods) as a single group for resolution based on whether a condition is met. For example, manifest presentation description processor 112 may consider the following conditions:

The elements (e.g., periods) are adjacent in the manifest presentation description, but do not need to be adjacent. For example, every other advertisement may be part of a group.

All the elements have an attribute, such as the @xlink:href and @xlink:actuate attributes, and such attributes are equal. Having equal values ensures proper processing as a group.

All the elements contain an element, such as a SupplementalProperty element with an @schemeIdUri attribute, that includes a descriptor, such as "urn:mpeg:dash:resolution-connected:2020", and a value, such as an @value attribute, for the descriptor whose value indicates the elements are part of the same group (e.g., the same value).

Some embodiments use the descriptor for periods that are part of a resolution group. Different requirements may be used to form resolution groups. However, in some embodiments, periods may be treated as a resolution group when the following conditions are met:

Period elements are adjacent in the manifest presentation description, but do not need to be adjacent.

Period elements are intended to be replaced as a group.

Period elements may be adjacent when the elements are consecutively ordered in a timeline in the manifest presentation description. Also, period elements are intended to be replaced as a group when all elements of the group need to be replaced with a request (e.g., a single request). That is, one element of the group cannot be only replaced without replacing other elements. Also, a single request may result in resolving the request to multiple elements. In some cases, the replaced elements may resolve to the same supplemental content. However, the request to replace all the elements is still sent, which meets the requirement of replacing the elements as a group.

Using the descriptor would allow manifest presentation description processor 112 to properly handle delayed resolution during the playback of digital video recorder assets that have replacement rights. That is, a video on demand video that is played can have its advertisements replaced. Or, the replacement may be performed in such a way that the video allows advertisement window changes via period replacement instead of full asset re-transcode in videos that include default supplemental content. Additionally, client 104 may use the remote resolution to enable pod re-resolution when a user seeks backwards (e.g., rewinds) to reencounter a pod again to provide a new supplemental content and/or otherwise tailored supplemental content. That is, client 104 may present new advertisements in the pod when a user rewinds and encounters the pod again. For any periods that include the above two conditions, manifest presentation description server 106 may use descriptors to signal the periods are part of a resolution group. Manifest presentation description processor 112 uses the descriptor to determine that the connected periods are treated as a single resolvable group with resolution results replacing/removing all resolution connected periods in the resolution group.

The use of a resolution group may be desired when the content in adjacent periods is related, such as in a linear creative playout of advertisements in non-linear watch behavior. The linear creative may be a series of advertisements that should be played in sequence. A non-linear watch behavior may be when a user watches part of the video and a pod, and then rewinds the video to a point before the pod. This causes the user to view the pod again. If advertisements are not replaced dynamically, then the pod could display the same advertisements again rather than displaying the next advertisement in the linear creative. Also, the re-resolution may result in multiple requests being sent that result in the same resolution of a group for each request.

Period Group Example

Figure 2:
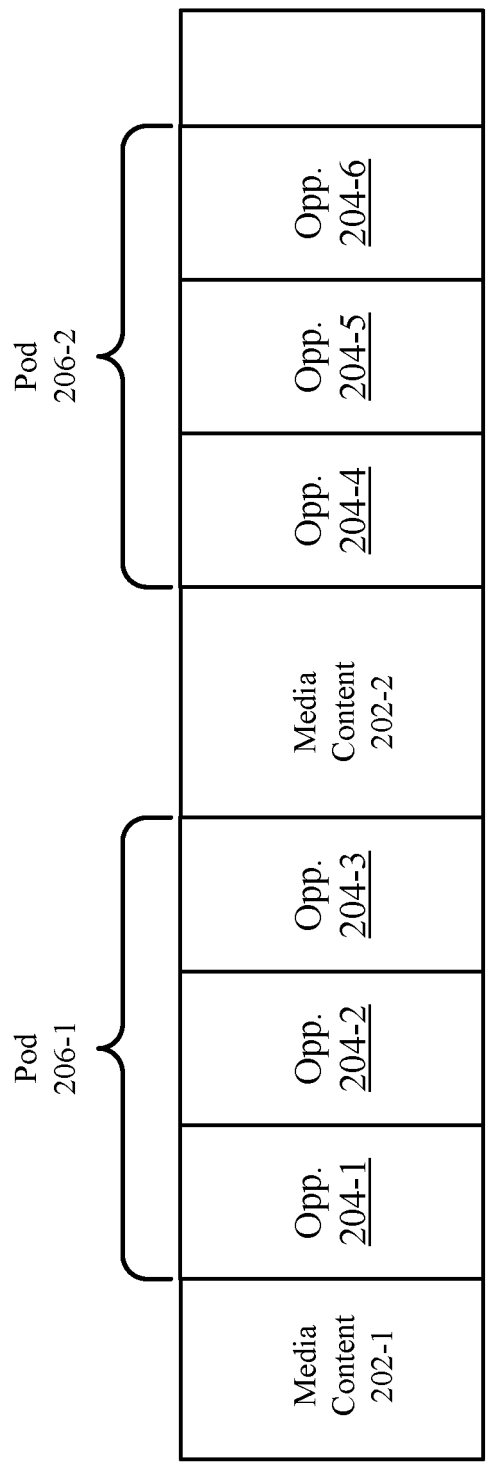
FIG. 2 depicts an example of a playback timeline according to some embodiments.

FIG. 2 depicts an example of a playback timeline according to some embodiments. The media presentation includes media content 202, which may be default media content of a video being played. Supplemental content, such as advertisements, may also be played during the media presentation.

In FIG. 2, media content 202-1 is played. Then, a pod 206-1 is encountered. Pod 206-1 may resolve to three opportunities 204-1 to 204-3, such as three ad slots in which an advertisement may be inserted. Three advertisements may be played in opportunities 204-1 to 204-3. After pod 206-1, media content 202-2 is played. Then, a pod 206-2 is encountered. Pod 206-2 may resolve to three opportunities 204-4 to 204-6, such as three ad slots in which an advertisement may be inserted in each. Three advertisements may be played in opportunities 204-4 to 204-6. The media presentation continues with additional media content 202 and/or ad pods 206.

In some embodiments, playback may become non-linear, such as a user may rewind the playback. For example, a user may be watching media content 202-2, but decide to rewind to media content 202-1. In this case, as playback proceeds, pod 206-1 will be encountered again. This causes the user to view the pod again. Also, the playback may reencounter a pod when playing a media presentation with default supplemental content in it. When pod 206-1 is encountered again, manifest presentation description processor 112 would then consider multiple opportunities 204-1 to 204-3 as a single entity for resolution using the descriptors.

Note that the functionality of a pod is described as part of period group in DASH, but this could be generalized to other manifest and remote element resolution forms as well as additional element types within DASH or other protocols, such as HLS. For example, the following functionalities may be used by a client 104 to use the dynamic resolution, but it is not necessary for all of them to exist:

Functionality 1: A presentation is able to explicitly describe where an opportunity exists in a presentation timeline and the timeline boundaries of the opportunity if fixed. The presentation timeline is what client 104 follows to request content.

Functionality 2: A presentation is able to describe where an opportunity can be resolved from.

Functionality 3: An opportunity resolution has a way to carry client sourced information used during resolution processes.

Functionality 4: The resulting supplemental content of a resolution is self-contained to allow for direct inclusion in the main presentation.

Functionality 5: The presentation processing model defines how the presentation timeline is adjusted/extended to accommodate the resolution result for the lifetime of the presentation.

With respect to functionality #1, periods describe where an opportunity exists as a period can define both the point in time and, in the case of default main content, the length of the opportunity within the main content timeline. The period's self-contained nature makes insertion/replacement operations possible in the dynamic resolution. These effects on the media presentation timeline define the timing nature of the period within the timeline. However, periods alone may not be enough to mark opportunities as the periods serve other purposes, so a further mechanism may be required to distinguish opportunity periods from other periods that are in a resolution group. To perform the distinguishing, some embodiments place the descriptor in each period that should be part of a resolution group to enhance the functionality of the period.

Periods are self-contained by marking the beginning and end of the period thus making them capable of being stand-alone containers for inserted content. These containers can be mixed and matched as necessary to fulfill the ordering and numbering requirements of the supplemental content, such as the advertisement creative. With the above assumption that periods are used as containers for opportunities, the descriptor value distinguishes opportunity related periods that can be combined into resolution groups from other periods.

A manifest presentation description may provide a remote locator, such as a uniform resource locator (URL), that provides an opportunity to resolve content using the link. For example, a link with the @xlink:href attribute can be resolved using the link.

For functionality #3, XLink is able to be combined with DASH attributes of UrlQueryInfo and ExtUrlQueryInfo objects to send client state to the server dynamically.

For functionality #4, the period is designed to be replaced by one or more instances of supplemental content.

For functionality #5, changes to the manifest presentation description may adjust or extend the presentation timeline to accommodate the inserted supplemental content for the lifetime of the media presentation.

Media Presentation Description Re-Resolution Examples

FIG. 3 depicts an initial manifest presentation description according to some embodiments. Client 104 may download the initial manifest presentation description upon initial playback of a media presentation, but the manifest presentation description may be received at other times, such as when client 104 changes to a different profile or bitrate. At 302, an opportunity is provided and described by a descriptor. The descriptor has an empty period, such as the descriptor Period @id="remote-placeholder". The identifier, such as an XLink decoration, of "remote-placeholder" indicates that the period should be resolved by client 104. This example is an "onRequest" resolution, which means client 104 should resolve the period when a condition is met, such as a time before the period is reached on the location in the playout timeline. An "onLoad" resolution is when client 104 resolves the opportunity when the manifest presentation description is received and does not wait for another condition to be met. Client 104 can resolve the period for supplemental content remotely, such as by using server 102. That is, client 104 may send a request to supplemental content request processor 108 to resolve the period by determining supplemental content for the period. The initial manifest presentation description and other manifest presentation descriptions described herein may provide a limited number of instances of remote period element(s) in the timeline, but this is to simplify the overall example. In practice there are multiple independent remote resolution points throughout a manifest presentation description. Also, for simplification, elements that may appear multiple times in a period have been omitted and attributes non-essential to the idea have been removed to shorten the overall manifest examples. These omissions are indicated by three dots " . . . ".

Figure 4A:
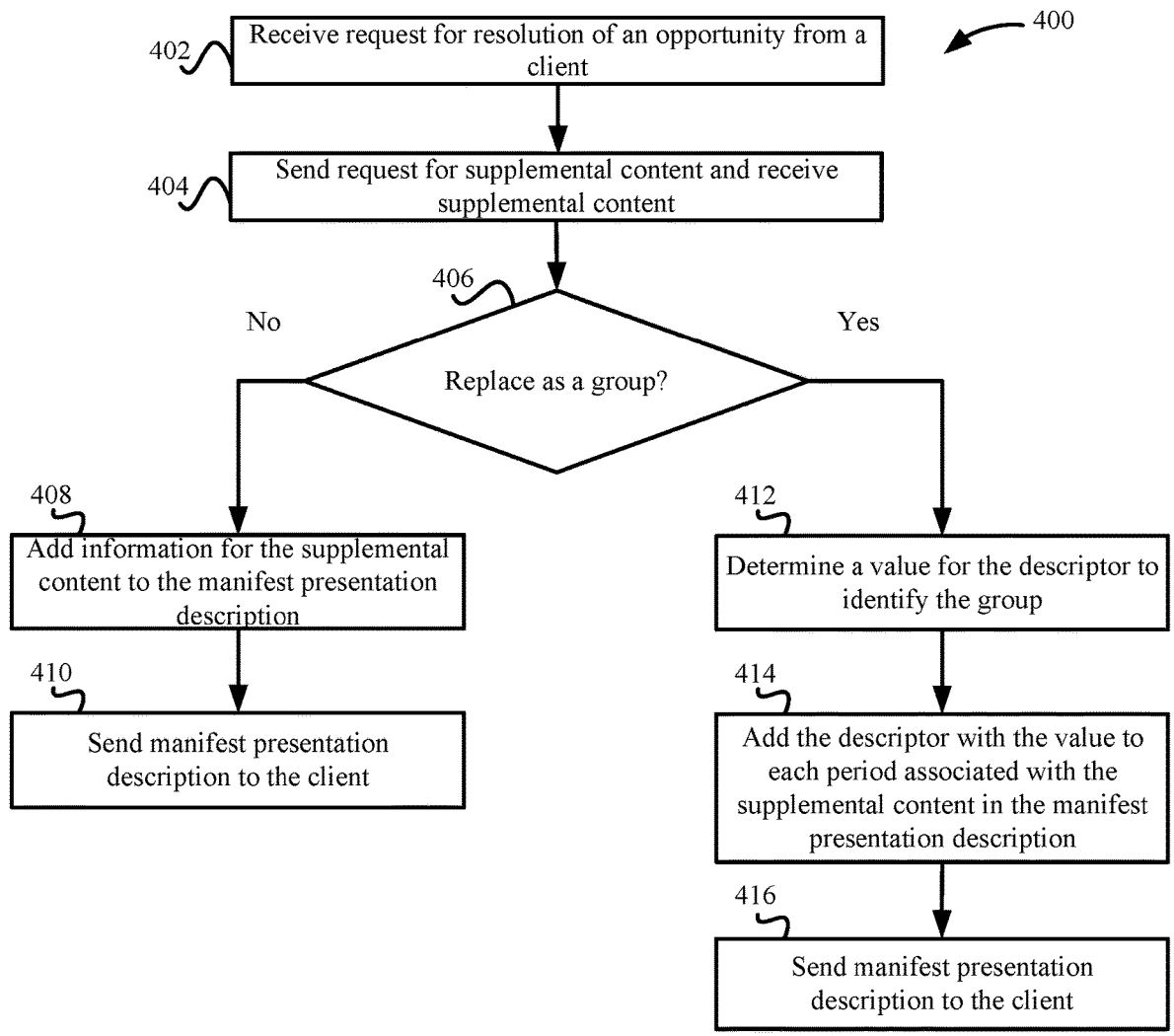
FIG. 4A depicts a simplified flowchart of a method for processing a request to resolve a period according to some embodiments.

FIG. 4A depicts a simplified flowchart 400 of a method for processing a request to resolve a period according to some embodiments. In some embodiments, supplemental content request processor 108 processes the request from client 104 to resolve a request for supplemental content for an opportunity, such as that shown at 302 in FIG. 3.

At 402, supplemental content request processor 108 receives a request for resolution of an opportunity from client 104 based on the request being sent to the link included in the opportunity at 302 in FIG. 3. For example, the request is received from the link https://example.com/manifests/xlink/1.

At 404, supplemental content request processor 108 sends a request for supplemental content to supplemental content server 110 and receives supplemental content. In some embodiments, the supplemental content is resolved to a group of periods that represent multiple instances of supplemental content in a group. In some cases, the group of supplemental content should be re-resolved to a group of supplemental content. However, to prevent multiple requests that are all resolved to a group of supplemental content, supplemental content request processor 108, supplemental content request processor 108 determines whether a request should be resolved to a group and also indicates to client 104 that the group should be re-resolved as a group.

At 406, supplemental content request processor 108 determines whether the group of supplemental content should be re-resolved as a group. If not, at 408, supplemental content request processor 108 adds information for the supplemental content to the manifest presentation description. The information may require client 104 to request each instance of supplemental content in the group. In this case, when re-resolution occurs, the links found for each instance of supplemental content are received from client 104 and resolved by supplemental content server 110. At 408, server 102 sends the manifest presentation description to client 104.

If the instances of supplemental content in the group should be re-resolved as a group, at 412, supplemental content request processor 108 determines a value for the descriptor to identify the group. The value may be unique to values that are used for client 104, unique to values used for the video, etc.

At 414, manifest presentation description server 106 adds the descriptor with the value to each period associated with the supplemental content in the manifest presentation description. Manifest presentation description server 106 may add the descriptor to an attribute. At 416, server 102 sends the manifest presentation description to client 104.

FIGS. 4B and 4C depict an example of a dynamic resolution response according to some embodiments. The response contains multiple periods where each period contains an attribute with a descriptor that is set to a same value to indicate the periods are part of a resolution group. For example, at 418-1 the attribute of @schemeIdUri includes a descriptor that is set to a value, such as the descriptor of "urn:mpeg:dash:resolution-connected:2020" is set to the value of "value="remote-1-1". The descriptor and the value indicate this period is part of a resolution group. For example, the descriptor "urn:mpeg:dash:resolution-connected:2020" indicates this period is part of a resolution group that is identified by a value of "remote-1-1". Further, the response includes additional attributes for remote resolution at 420-1 of xlink:href="https://example.com/manifests/xlink/1-1" xlink:actuate="onRequest". This is a link to use to request the resolution for the group, and the resolution request is performed on request when a condition is met.

At 418-2, a second period includes the same attribute with a descriptor that includes the same value as the first period. At 420-2 the remote resolution attributes are the same as the first period.

A third period and fourth period at 418-3 and 418-4, respectively, include the same attribute with a descriptor that includes the same value as the first and second periods. Also, the third period and the fourth period at 420-3 and 420-4, respectively, include the remote resolution attributes that are the same as the first period. Accordingly, the four periods have been designated as being resolved as a group, which may be used when re-resolution occurs. If the descriptors were not present, client 104 would send a request for each period.

FIGS. 5A and 5B depict an in-memory manifest presentation description resulting from client 104 resolving the periods in the initial manifest presentation description according to some embodiments. The in-memory manifest presentation description contains multiple periods where each period contains the attribute with the descriptor that is set to the value to indicate the periods are part of a resolution group, which was received in the response in FIGS. 4B and 4C. For example, at 502-1, the attribute of @schemeIdUri includes a descriptor "urn:mpeg:dash:resolution-connected: 2020" that is set to a value, such as "value='remote 1'" that indicates this is part of a resolution group. Further, the response includes additional attributes for remote resolution at 504-1 of xlink:href="https://example.com/manifests/xlink/1-1" xlink:actuate="onRequest". Manifest presentation description processor 112 takes the original period with the XLink attributes, identified by period id "remote-placeholder", and replaces the period with the period elements from the remote response, identified by the period id for each respective period using the information from the response. For example, the period ids that are inserted are "remote-1-1-1" at 504-1 with the descriptor and value at 502-1, "remote-1-1-2" at 504-2 with the descriptor and value at 502-2, "remote-1-1-3" at 504-3 with the descriptor and value at 502-3, and "remote-1-1-4" at 504-4 with the descriptor and value at 502-4. The content of the media presentation is also included in the in-memory manifest presentation description at 506-1 and 506-2.

Re-Resolution of Periods

Figure 6A:
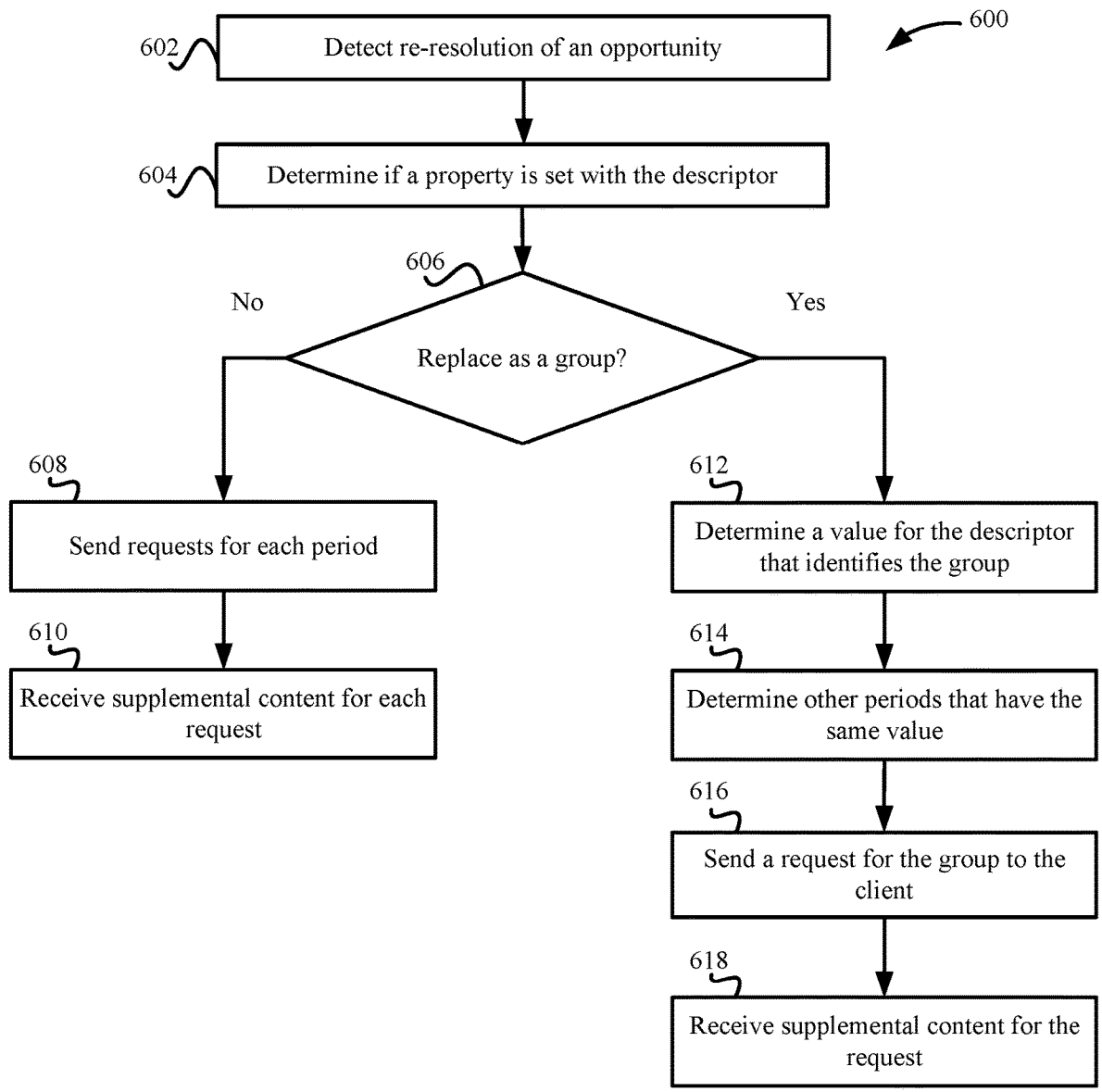
FIG. 6A depicts a simplified flowchart of a method for processing re-resolution of periods according to some embodiments.

The following describes client 104 performing re-resolution on the periods previously provided by the first resolution, such as when a client 104 rewinds a presentation and encounters a pod again. FIG. 6A depicts a simplified flowchart 600 of a method for processing a re-resolution of periods according to some embodiments. At 602, client 104 detects re-resolution of an opportunity. For example, client 104 may re-encounter a period in the in-memory manifest presentation description. At 604, client 104 determines if the period has a property set with the descriptor that identifies the period is part of a resolution group. At 606, client 104 determines if the period should be replaced as a group. If not, at 608, client 104 sends a request for the period. Also, client 104 may send a request found in each period of the pod. At 610, client 104 receives supplemental content for each request.

If the period is to be replaced as a group, at 612, client 104 determines a value for the descriptor that identifies the group. At 614, client 104 determines other periods that have the same value. For example, client 104 may sequentially review adjacent periods to determine which periods have the same value. Once client 104 encounters a period that does not have the value, client 104 may stop reviewing periods. Client 104 may use other methods also, such as reviewing each period in a pod to determine which periods include the value. These periods may not be adjacent.

At 616, client 104 sends a request for the group. In some embodiments, client 104 sends a single request for supplemental content. The link that is found in each period that is used to request the supplemental content may be the same. Thus, a single request may be used. At 618, client 104 receives supplemental content for the request. In this case, server 102 may resolve the request to a group (e.g., multiple instances of supplemental content). The group may be a different group of supplemental content from the prior resolution of the group, the same supplemental content, or include some instances of different supplemental content that are different from the prior resolution.

FIGS. 6B and 6C depict another example of a dynamic resolution response resulting from the client resolving new periods in the in-memory manifest presentation description with supplemental content according to some embodiments. The in-memory manifest presentation description contains multiple periods where each period contains the property and a descriptor that is set to the value to indicate the periods are part of a resolution group. This resolution group replaces the resolution group that was received in FIGS. 4B and 4C.

Manifest presentation description processor 112 replaces the periods in the in-memory manifest presentation description with information for each respective period using the information from the re-resolution response. FIGS. 7A and 7B depict the in-memory manifest presentation description resulting from client 104 performing re-resolution on the periods previously provided by the first resolution and receiving a response found in FIGS. 6A and 6B according to some embodiments. Using the descriptor that includes the same value for the group resolution, manifest presentation description processor 112 can request supplemental content for each period in the pod as a group. For example, when client 104 rewound and started playing the presentation from a prior point, client 104 again reached a remote resolution element "remote 1-1". However, this time the period contains the descriptor so manifest presentation description processor 112 searches for and identifies other periods that should also be considered part of the group by identifying other periods with the same value for the descriptor.

Manifest presentation description processor 112 creates a logical remote resolution group out of periods "remote-1-1-1", "remote-1-1-2", "remote-1-1-3", and "remote-1-1-4" in FIGS. 5A and 5B. Manifest presentation description processor 112 performs the remote resolution by sending a request using the link at 504 in FIG. 5A. For example, the representations (e.g., the information associated with "Representation id") in the periods are for the content to request. Manifest presentation description processor 112 receives the resolution result shown in FIGS. 6A and 6B. Manifest presentation description processor 112 removes the full resolution group ("remote-1-1-1", "remote-1-1-2", "remote-1-1-3", and "remote-1-1-4") from the in-memory manifest and inserts the new remote elements ("remote-1-2-1" at 702-1, "remote-1-2-2" at 702-2, etc.) in their place. It is noted that four periods have been resolved to a different number of periods (e.g., two periods). There is not a restriction on the number of periods that can be received in a resolution request. Client 104 does not need to send the descriptor to the server to indicate the resolution group, server 102 is only getting the singular resolution request. Supplemental content server 110 knows from the link that is used to process the remote resolution for a group of supplemental content. This is different from behavior that sent requests for each period when manifest presentation description processor 112 encountered re-resolution of the multiple periods.

Replacement of Default Content

The following describes the replacement of default supplemental content found in the manifest presentation description. The replacement may occur when a video on demand media presentation is watched. The video on demand presentation may have default advertisements in the media presentation description that are then resolved to different advertisements.

FIGS. 8A and 8B depicts an initial manifest presentation description downloaded by client 104 that has adjacent remote periods with default content according to some embodiments. The periods have the period IDs of "Period@id='original-ad-1'" at 802-1 and "Period@id='original-ad-2'" at 802-2. The periods identify default content that may be replaced as client 104 approaches the respective location in the playout timeline. The default content may be different from placeholder opportunities in that the default content define content to play and are not a placeholder to resolve content. The adjacent periods that represent default ad content contain the attribute SupplementalProperty with the descriptor "schemeIdUri='urn:mpeg:dash:resolution-connected:2020'" at 804-1 and 804-2. The descriptor has the same value of "value='original-ad-1'" at 804-1 and 804-2. Manifest presentation description processor 112 uses the descriptor and value to recognize the periods are in the same resolution group.

Replacement may occur when a media presentation is replayed, such as in an on demand video. Manifest presentation description processor 112 uses the descriptor and value provided in the original manifest to collectively replace all periods with the resolution result. For example, manifest presentation description processor 112 may send a request for the group after analyzing the periods to determine which periods are part of the group. As discussed above, manifest presentation description processor 112 sends a single request for the group. If the descriptor is not included, manifest presentation description processor 112 may re-resolve each period independently. The default content may be replayed if the resolution fails. That is, remote replacement as a group is not performed.

FIG. 9 depicts an example remote period response that contains multiple periods intended to replace the default content according to some embodiments. In this case, the period IDs are "remote-1-1-1" at 902-1, "remote-1-1-2" at 902-2, "remote-1-1-3" at 902-3, and so on. Additionally, the remote resolution link is included as "xlink:hre f='https://example.com/manifests/xlink/1-1' xlink:actuate='onRequese'", which retrieves different content for the period. The descriptor identifying the resolution group is also included as "SupplementalProperty schemeIdUri='urn:mpeg:dash:resolution-connected:2020' value='remote-1-1'" at 904-1, 904-2, and 904-3, respectively, for each period in the group. The descriptor and value may be used in another re-resolution to resolve the periods as a group, such as when a rewinding of the media presentation occurs to replay the pod again.

FIGS. 10A, 10B, and 10C depict an in-memory manifest presentation document that results from the re-resolution according to some embodiments. The in-memory manifest presentation description contains multiple periods where each period contains the attribute with the descriptor that is set to the value to indicate the periods are part of a resolution group, which was received in the response in FIG. 9. For example, at 1002-1, 1002-2, and 1002-3, the attribute of @schemeIdUri includes a descriptor "urn:mpeg:dash:resolution-connected:2020" that is set to a value, such as "value='remote-1-1'" that indicates this is part of a resolution group. Further, the response includes additional attributes for remote resolution at 1004-1, 1004-2, and 1004-3 of xlink:href="https://example.com/manifests/xlink/1-1" xlink:actuate="onRequest". Manifest presentation description processor 112 takes the original periods that are identified by the descriptor and same value and replaces the periods with the period elements from the remote response. For example, the period ids that are inserted are "remote-1-1-1", "remote-1-1-2", and "remote-1-1-3". The content of the media presentation is also included in the in-memory manifest presentation description at 1006 and also after the supplemental content (not shown).

Using the descriptor that includes the same value for the group resolution, manifest presentation description processor 112 can send a request supplemental content as a group. The group is replaced by the new resolution. It is noted that the new resolution may include a different number of periods that replace the previous group. This is different from behavior that requested the same default supplement content for each period when manifest presentation description processor 112 encountered re-resolution. Using the remote resolution link, manifest presentation description processor 112 resolves the remote resolution in the initial manifest presentation document and replaces the resolution group with the response detailed by the resolution response. Server 102 may resolve the link as a group per its rules.

Example Embodiments

In some embodiments, a method comprising: determining, by a computing device, an element is associated with a value in a manifest description presentation for a media presentation being played, wherein the value indicates the element of the manifest description presentation is part of a group; reviewing, by the computing device, the manifest description presentation to determine a plurality of elements that are associated with the value; sending, by the computing device, a request to a device to resolve the plurality of elements using information from one of the elements; and receiving, by the computing device, information for supplement content for the group, wherein the information for the supplemental content is inserted in the manifest description presentation in place of the plurality of elements.

In some embodiments, the value is associated with a descriptor, and the descriptor is used to identify the plurality of elements should be resolved as the group.

In some embodiments, the request is sent to resolve the group when the value associated with the plurality of elements indicates the plurality of elements are part of the group.

In some embodiments, the value that is associated with the plurality of elements is equal.

In some embodiments, the plurality of elements are resolved as the group when the plurality of elements are associated with default supplemental content in the manifest description presentation that should be replaced.

In some embodiments, the plurality of elements are resolved as the group when the plurality of elements are reencountered in the manifest description presentation during a playback session for the media presentation.

In some embodiments, the plurality of elements are associated with a pod, wherein the pod is inserted between two media segments during playback of the media presentation.

In some embodiments, the plurality of elements are associated with a period attribute that defines each element.

In some embodiments, the supplemental content comprises advertisements to be inserted into the media presentation during playback.

In some embodiments, information that is used to request the supplemental content is included in each of the plurality of elements.

In some embodiments, sending the request comprises: sending a single request with the information; and replacing the plurality of elements in the manifest description presentation with the information for the supplemental content that is received in response to the single request.

In some embodiments, the method further comprising: when the value is encountered in the element; reviewing other elements to determine whether the other elements include the value; and including the other elements in the group when the other elements include the value.

In some embodiments, the other elements are adjacent to the element in the manifest description presentation.

In some embodiments, a non-transitory computer-readable storage medium containing instructions, that when executed, control a computer system to be operable for: determining an element is associated with a value in a manifest description presentation for a media presentation being played, wherein the value indicates the element of the manifest description presentation is part of a group; reviewing the manifest description presentation to determine a plurality of elements that are associated with the value; sending a request to a device to resolve the plurality of elements using information from one of the elements; and receiving information for supplement content for the group, wherein the information for the supplemental content is inserted in the manifest description presentation in place of the plurality of elements.

In some embodiments, the value is associated with a descriptor, and the descriptor is used to identify the plurality of elements should be resolved as the group.

In some embodiments, the request is sent to resolve the group when the value associated with the plurality of elements indicates the plurality of elements are part of the group.

In some embodiments, the plurality of elements are resolved as the group when the plurality of elements are associated with default supplemental content in the manifest description presentation that should be replaced.

In some embodiments, information that is used to request the supplemental content is included in each of the plurality of elements.

In some embodiments, sending the request comprises: sending a single request with the information; and replacing the plurality of elements in the manifest description presentation with the information for the supplemental content that is received in response to the single request.

In some embodiments, an apparatus comprising: one or more computer processors; and a non-transitory computer-readable storage medium comprising instructions, that when executed, control the one or more computer processors to be operable for: determining an element is associated with a value in a manifest description presentation for a media presentation being played, wherein the value indicates the element of the manifest description presentation is part of a group; reviewing the manifest description presentation to determine a plurality of elements that are associated with the value; sending a request to a device to resolve the plurality of elements using information from one of the elements; and receiving information for supplement content for the group, wherein the information for the supplemental content is inserted in the manifest description presentation in place of the plurality of elements.

System

Figure 11:
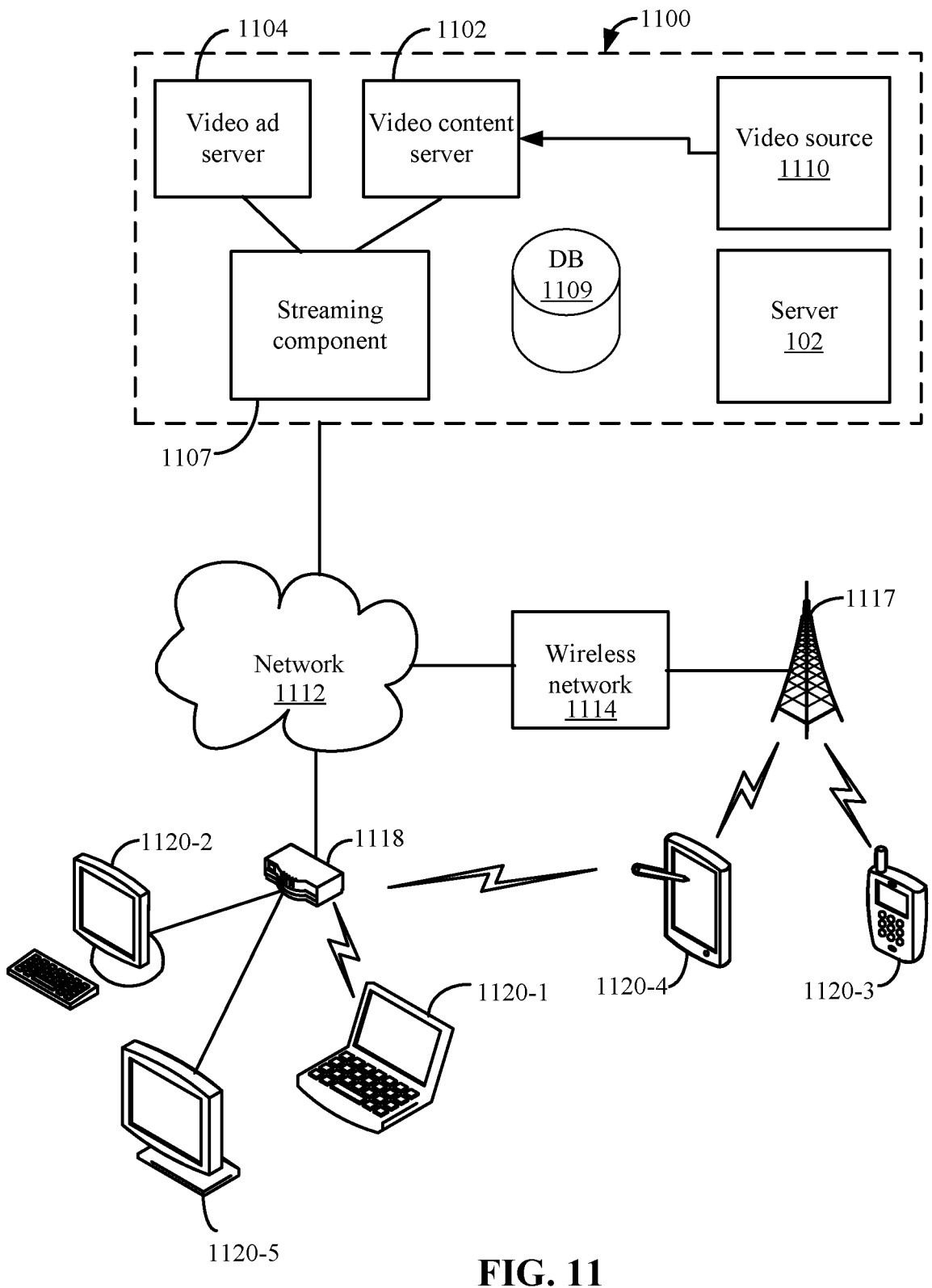
FIG. 11 depicts a video streaming system in communication with multiple client devices via one or more communication networks according to one embodiment.

Features and aspects as disclosed herein may be implemented in conjunction with a video streaming system 1100 in communication with multiple client devices via one or more communication networks as shown in FIG. 11. Aspects of the video streaming system 1100 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1100, video data may be obtained from one or more sources for example, from a video source 1110, for use as input to a video content server 1102. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1100 may include one or more computer servers or modules 1102, 1104, and/or 1107 distributed over one or more computers. Each server 1102, 1104, 1107 may include, or may be operatively coupled to, one or more data stores 1109, for example databases, indexes, files, or other data structures. A video content server 1102 may access a data store (not shown) of various video segments. The video content server 1102 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1104 may access a data store of relatively short videos (e.g., 10 second, 30 second, or 60 second video advertisements)

configured as advertising for a particular advertiser or message. The advertising may be provided for an advertiser in exchange for payment of some kind or may comprise a promotional message for the system 1100, a public service message, or some other information. The video advertising server 1104 may serve the video advertising segments as directed by a user interface controller (not shown).

The video streaming system 1100 may further include an integration and streaming component 1107 that integrates video content and video advertising into a streaming video segment. For example, streaming component 1107 may be a content server or streaming media server. A controller (not shown) may determine the selection or configuration of advertising in the streaming video based on any suitable algorithm or process. The video streaming system 1100 may include other modules or units not depicted in FIG. 11, for example, administrative servers, commerce servers, network infrastructure, advertising selection engines, and so forth.

The video streaming system 1100 may connect to a data communication network 1112. A data communication network 1112 may comprise a local area network (LAN), a wide area network (WAN), for example, the Internet, a telephone network, a wireless cellular telecommunications network (WCS) 1114, or some combination of these or similar networks.

One or more client devices 1120 may be in communication with the video streaming system 1100, via the data communication network 1112, wireless cellular telecommunications network 1114, and/or another network. Such client devices may include, for example, one or more laptop computers 1120-1, desktop computers 1120-2, "smart" mobile phones 1120-3, tablet devices 1120-4, network-enabled televisions 1120-5, or combinations thereof, via a router 1118 for a LAN, via a base station 1117 for a wireless cellular telecommunications network 1114, or via some other connection. In operation, such client devices 1120 may send and receive data or instructions to the system 1100, in response to user input received from user input devices or other input. In response, the system 1100 may serve video segments and metadata from the data store 1109 responsive to selection of media programs to the client devices 1120. Client devices 1120 may output the video content from the streaming video segment in a media player using a display screen, projector, or other video output device, and receive user input for interacting with the video content.

Distribution of audio-video data may be implemented from streaming component 1107 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 1107 may communicate with client device 1120 using control messages and data messages to adjust to changing network conditions as the video is played. These control messages can include commands for enabling control functions such as fast forward, fast reverse, pausing, or seeking to a particular part of the file at the client.

Since streaming component 1107 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1107 may use TCP-based protocols, such as HTTP and Real Time Messaging Protocol (RTMP). Streaming component 1107 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 12:
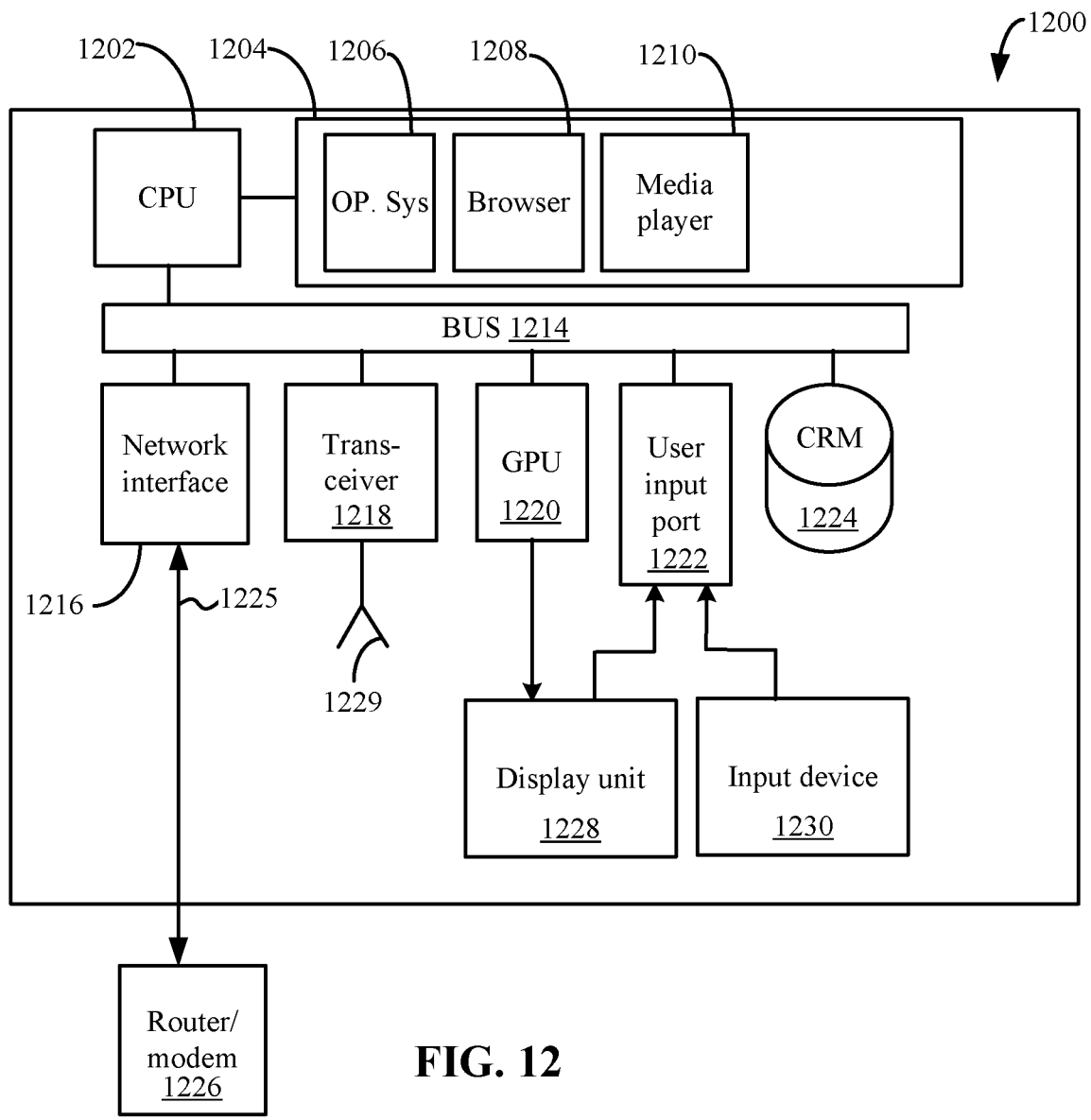
FIG. 12 depicts a diagrammatic view of an apparatus for viewing video content and advertisements.

Referring to FIG. 12, a diagrammatic view of an apparatus 1200 for viewing video content and advertisements is illustrated. In selected embodiments, the apparatus 1200 may include a processor (CPU) 1202 operatively coupled to a processor memory 1204, which holds binary-coded functional modules for execution by the processor 1202. Such functional modules may include an operating system 1206 for handling system functions such as input/output and memory access, a browser 1208 to display web pages, and media player 1210 for playing video. The memory 1204 may hold additional modules not shown in FIG. 12, for example modules for performing other operations described elsewhere herein.

A bus 1214 or other communication component may support communication of information within the apparatus 1200. The processor 1202 may be a specialized or dedicated microprocessor configured or operable to perform particular tasks in accordance with the features and aspects disclosed herein by executing machine-readable software code defining the particular tasks. Processor memory 1204 (e.g., random access memory (RAM) or other dynamic storage device) may be connected to the bus 1214 or directly to the processor 1202, and store information and instructions to be executed by a processor 1202. The memory 1204 may also store temporary variables or other intermediate information during execution of such instructions.

A computer-readable medium in a storage device 1224 may be connected to the bus 1214 and store static information and instructions for the processor 1202; for example, the storage device (CRM) 1224 may store the modules 1206, 1208, 1210 and 1212 when the apparatus 1200 is powered off, from which the modules may be loaded into the processor memory 1204 when the apparatus 1200 is powered up. The storage device 1224 may include a non-transitory computer-readable storage medium holding information, instructions, or some combination thereof, for example instructions that when executed by the processor 1202, cause the apparatus 1200 to be configured or operable to perform one or more operations of a method as described herein.

A communication interface 1216 may also be connected to the bus 1214. The communication interface 1216 may provide or support two-way data communication between the apparatus 1200 and one or more external devices, e.g., the streaming system 1100, optionally via a router/modem 1226 and a wired or wireless connection. In the alternative, or in addition, the apparatus 1200 may include a transceiver 1218 connected to an antenna 1229, through which the apparatus 1200 may communicate wirelessly with a base station for a wireless communication system or with the router/modem 1226. In the alternative, the apparatus 1200 may communicate with a video streaming system 1100 via a local area network, virtual private network, or other network. In another alternative, the apparatus 1200 may be incorporated as a module or component of the system 1100 and communicate with other components via the bus 1214 or by some other modality.

The apparatus 1200 may be connected (e.g., via the bus 1214 and graphics processing unit 1220) to a display unit 1228. A display 1228 may include any suitable configuration for displaying information to an operator of the apparatus 1200. For example, a display 1228 may include or utilize a liquid crystal display (LCD), touchscreen LCD (e.g., capacitive display), light emitting diode (LED) display, projector, or other display device to present information to a user of the apparatus 1200 in a visual display.

One or more input devices 1230 (e.g., an alphanumeric keyboard, microphone, keypad, remote controller, game controller, camera, or camera array) may be connected to the bus 1214 via a user input port 1222 to communicate information and commands to the apparatus 1200. In selected embodiments, an input device 1230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1228, for example using a touch sensitive screen. A cursor control device may communicate direction information and command selections to the processor 1202 and control cursor movement on the display 1228. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving, by a computing device, a manifest presentation description for a media presentation being played, wherein the manifest presentation description includes a first element, wherein:
   the first element is resolved by sending a first request for supplemental content,
   in response to sending the first request, first information is received for a plurality of elements for first supplemental content, and
   the first supplemental content is played as an insertion into the media presentation;
   storing, by the computing device, the first information for the plurality of elements in the manifest presentation description, wherein a value that indicates the plurality of elements are part of a group is stored and associated with the plurality of elements in the manifest presentation description;
   detecting, by the computing device, that a second element in the first information for the plurality of elements in the manifest presentation description for the media presentation being played is being re-resolved when the second element is encountered during the playback of the media presentation after previously being resolved from the first element during the playback;

determining, by the computing device, the second element is one of the plurality of elements based on the second element being associated with the value that was stored and associated with the plurality of elements in the manifest description presentation;

reviewing, by the computing device, the manifest presentation description to determine other elements in the plurality of elements that are associated with the value;

sending, by the computing device, a second request to a device to resolve the plurality of elements using information from one of the elements; and receiving, by the computing device, second information for second supplement content for the group, wherein the second information for the supplemental content is inserted in the manifest presentation description in place of the plurality of elements.

2. The method of claim 1, wherein:
the value is associated with a descriptor, and
the descriptor is used to identify the plurality of elements should be resolved as the group.

3. The method of claim 1, wherein:
the second request is sent to resolve the plurality of elements when the value associated with the plurality of elements indicates the plurality of elements are part of the group.

4. The method of claim 3, wherein the value that is associated with the plurality of elements is equal.

5. The method of claim 1, wherein the element is associated with default supplemental content in the manifest presentation description that should be replaced.

6. The method of claim 1, wherein the element is reencountered in the manifest presentation description based on the playback for the media presentation being rewound.

7. The method of claim 1, wherein the element is associated with a pod, wherein the pod is inserted between two media segments during playback of the media presentation.

8. The method of claim 1, wherein the element is associated with a period attribute that defines the element.

9. The method of claim 1, wherein the supplemental content comprises advertisements to be inserted into the media presentation during playback.

10. The method of claim 1, wherein the information from one of the elements that is used to request the supplemental content is included in each of the plurality of elements.

11. The method of claim 10, wherein sending the second request comprises:
sending a single second request with the information from one of the elements; and
replacing the plurality of elements in the manifest presentation description with the second information for the supplemental content that is received in response to the single second request.

12. The method of claim 1, further comprising:
when the value is encountered in the element, performing:
reviewing other elements to determine whether the other elements include the value; and
including the other elements in the group when the other elements include the value.

13. The method of claim 12, wherein the other elements are adjacent to the element in the manifest presentation description.

14. The method of claim 1, wherein the plurality of elements should be resolved using a single request of the second request.

15. A non-transitory computer-readable storage medium containing instructions, that when executed, control a computer system to be operable for:
receiving a manifest presentation description for a media presentation being played, wherein the manifest presentation description includes a first element, wherein:
the first element is resolved by sending a first request for supplemental content,
in response to sending the first request, first information is received for a plurality of elements for first supplemental content, and
the first supplemental content is played as an insertion into the media presentation;
storing the first information for the plurality of elements in the manifest presentation description, wherein a value that indicates the plurality of elements are part of a group is stored and associated with the plurality of elements in the manifest presentation description;
detecting that a second element in the first information for the plurality of elements in the manifest presentation description for the media presentation being played is being re-resolved when the second element is encountered during the playback of the media presentation after previously being resolved from the first element during the playback;
determining the second element is one of the plurality of elements based on the second element being associated with the value that was stored and associated with the plurality of elements in the manifest description presentation;
reviewing the manifest presentation description to determine other elements in the plurality of elements that are associated with the value;
sending a second request to a device to resolve the plurality of elements using information from one of the elements; and
receiving second information for second supplement content for the group, wherein the second information for the supplemental content is inserted in the manifest presentation description in place of the plurality of elements.

16. The non-transitory computer-readable storage medium of claim 15, wherein:
the value is associated with a descriptor, and
the descriptor is used to identify the plurality of elements should be resolved as the group.

17. The non-transitory computer-readable storage medium of claim 15, wherein:
the second request is sent to resolve the plurality of elements when the value associated with the plurality of elements indicates the plurality of elements are part of the group.

18. The non-transitory computer-readable storage medium of claim 15, wherein the element is associated with default supplemental content in the manifest presentation description that should be replaced.

19. The non-transitory computer-readable storage medium of claim 15, wherein information from one of the elements that is used to request the supplemental content is included in each of the plurality of elements.

20. The non-transitory computer-readable storage medium of claim 19, wherein sending the second request comprises:
sending a single second request with the information from one of the elements; and replacing the plurality of elements in the manifest presentation description with the second information for the supplemental content that is received in response to the single second request.

21. An apparatus comprising:

one or more computer processors; and a non-transitory computer-readable storage medium comprising instructions, that when executed, control the one or more computer processors to be operable for:

receiving a manifest presentation description for a media presentation being played, wherein the manifest presentation description includes a first element, wherein:
   the first element is resolved by sending a first request for supplemental content,
   in response to sending the first request, first information is received for a plurality of elements for first supplemental content, and
   the first supplemental content is played as an insertion into the media presentation;

storing the first information for the plurality of elements in the manifest presentation description, wherein a value that indicates the plurality of elements are part of a group is stored and associated with the plurality of elements in the manifest presentation description;

detecting that a second element in the first information for the plurality of elements in the manifest presentation description for the media presentation being played is being re-resolved when the second element is encountered during the playback of the media presentation after previously being resolved from the first element during the playback;

determining the second element is one of the plurality of elements based on the second element being associated with the value that was stored and associated with the plurality of elements in the manifest description presentation;

reviewing the manifest presentation description to determine other elements in the plurality of elements that are associated with the value;

sending a second request to a device to resolve the plurality of elements using information from one of the elements; and receiving second information for second supplement content for the group, wherein the second information for the supplemental content is inserted in the manifest presentation description in place of the plurality of elements.

* * * * *